Nov. 20, 1956 J. J. ZIMMERMAN 2,771,047
AUTOMATIC SOLDERING MECHANISM
Filed Aug. 11, 1954 8 Sheets-Sheet 1

INVENTOR.
Jack J. Zimmerman
BY
Mueller & Aichele
Attys

Nov. 20, 1956  J. J. ZIMMERMAN  2,771,047
AUTOMATIC SOLDERING MECHANISM
Filed Aug. 11, 1954  8 Sheets-Sheet 6

INVENTOR.
Jack J. Zimmerman
BY Mueller & Aichele
Attys

Nov. 20, 1956  J. J. ZIMMERMAN  2,771,047
AUTOMATIC SOLDERING MECHANISM
Filed Aug. 11, 1954  8 Sheets-Sheet 7

INVENTOR.
Jack J. Zimmerman
BY
Mueller & Aichele
Attys.

United States Patent Office 2,771,047
Patented Nov. 20, 1956

2,771,047

AUTOMATIC SOLDERING MECHANISM

Jack J. Zimmerman, Riverside, Ill., assignor to Motorola, Inc., Chicago, Ill., a corporation of Illinois Application August 11, 1954, Serial No. 449,119

9 Claims. (Cl. 113—59)

The present invention relates to an improved mechanism for automatically providing local soldering to the connecting junctions of electronic apparatus such as radio receivers, television receivers, or the like.

In recent years, printed or plated circuit techniques have been applied to electronic apparatus to improve and render more efficient the manufacturing process of such equipment. In accordance with printed circuit techniques, insulating panels are provided with a conductive design plated or otherwise formed directly on the panels and which replaces the wire leads previously used to interconnect the various components supported on the panels. This eliminates the many operations previously required in cutting and forming these leads. Even with the plated circuit assemblies, however, the connections from the various components must still be soldered to the printed circuit. Usually this soldering is carried out manually which adds unduly to the manufacturing cost of the units. The printed circuit assembly does lend itself to dip soldering techniques, but even though dip soldering enables a plurality of connections to be simultaneously soldered with resulting increased efficiency, it has several limitations since it wastefully applies solder to all exposed metal parts and subjects the insulating panel to a possible deteriorating baking heat. The dip soldering method also precludes the possibility of using both sides of the panel for supporting components and associated plated circuitry, thus limiting the overall compactness of the assembly. This limitation occurs since nothing can be applied to the soldered side of the panel that would suffer by necessary immersion in molten solder.

In order to provide improved automatic soldering to the connections of components on a printed circuit panel, and to overcome the limitations of the dip soldering methods, applicant devised the machine and method disclosed and claimed in copending application 292,424 filed June 9, 1952. In the machine of that application, a series of solder carrying members are mounted on an elevator in an upright position and immersed in molten solder. The panels to be soldered are successively positioned directly over the molten solder container, and the solder carrying members are raised to an elevated position to carry solder only to local areas of the panel that require soldering.

The present invention provides an automatic soldering machine of a type similar to that disclosed in the copending application referred to above. However, the present invention differs from the machine disclosed in that application in that it may be constructed more cheaply and has greater flexibility. Moreover, several features are incorporated in the machine of the present application that contribute to increased operating efficiency thereof.

It is, accordingly, an object of the present invention to provide an improved automatic soldering machine for effecting local soldering between the terminals of components supported on a printed circuit panel assembly and the conductive design formed on such panel.

A more general object of the invention is to provide an automatic soldering machine capable of providing improved soldering connections to a multiplicity of distinct soldering areas.

Another object of the invention is to provide such an improved automatic soldering machine that is relatively simple in its construction and which can be constructed more cheaply than prior art machines of this general type.

A feature of the invention is the provision of an improved soldering machine in which a plurality of supporting members for printed circuit panel assemblies, or the like, are radially mounted on a central vertical shaft, and in which the central shaft is intermittently rotated to position the supporting members precisely over a molten solder container in succession, the container having an elevator therein with upwardly projecting solder-carrying members and which elevator moves from a lower to an upper position in response to the successive positioning of the supporting members to move the solder-carrying members upwardly into local soldering contact with the respective supported printed circuit assemblies.

Another feature of the invention is the provision of such an improved automatic soldering machine in which a stripper plate is provided in the solder container in scraping relation with the solder carrying members so that such members are retained relatively free of oxides and dross.

Another feature of the invention is the provision of such an improved automatic soldering machine in which a cover for the solder container and a wiper for the surface of the solder therein and various elements below the surface, are mounted on a horizontally movable chain assembly, and which includes a drive mechanism for the chain assembly that is operated to move the cover to an open position and the wiper across the surface of the solder upon the positioning of each supporting member over the container and prior to the elevation of the solder-carrying members to their solder contact positions.

Yet another feature of the invention is the provision of such an improved automatic soldering machine in which the solder-carrying members are in the form of solder-wettable metal rods composed, for example, of steel, and each having a cup-shaped solder-carrying depression in its upper end, the surface of the solder-wettable metal rods functioning to lessen the susceptibility thereof to the formation of oxides, but the rim adjacent the solder-carrying depression of each member is plated with a non-wettable material to preserve a meniscus on the molten solder carried in the cavity, the non-wettable coating being subject to accumulate hard oxides but such oxides being easily removed by the stripper plate due to the limited area of the coated rim.

Another feature of the invention is the provision of such an automatic soldering machine which includes a pressurized manually operated lubricating system for supplying heat resistant powdered lubricant to various moving members adjacent the solder container.

The above and other features of the invention which are believed to be new are set forth with particularity in the appended claims. The invention itself, however, together with further objects and advantages thereof, may best be understood by reference to the following description when taken in conjunction with the accompanying drawings in which:

The automatic soldering machine of the present invention comprises a base member with a vertical shaft rotatably mounted on the base member. A plurality of arms are affixed to the upper end of the vertical shaft and extend radially outward therefrom at fixed angles with respect to one another. A corresponding plurality of supporting members are respectively mounted at the end of the arms remote from the shaft. A plurality of disc-like cam follower members are rotatably mounted on the vertical shaft on respective uniplanar radial axes of the shaft so as to be spaced around the periphery of the shaft. A horizontal drive shaft is provided, and the drive shaft has a cam affixed thereto which successively engages the cam follower members upon rotation of the drive shaft. The coupling arrangement is such that intermittent rotational motion is provided for the vertical shaft upon continuous rotation of the drive shaft. A solder container is positioned to receive the supporting members in succession upon the intermittent rotational motion of the vertical shaft, with each of the supporting members being arrested for a predetermined interval in a position directly over the container. An elevator is mounted in the container and is movable therein between a lower and an upper position. A plurality of distinct elongated solder-carrying members are mounted on the elevator and extend vertically upward therefrom in spaced parallel relation. Finally, means is provided for moving the elevator from its lower to its upper position upon the positioning of each of the supporting members over the container to move the solder carrying members towards the positioned supporting member.

Referring now to the drawings, and more particularly to Figs. 1–4, the improved automatic solder machine of the present invention includes a base casting 10. A stationary vertical spindle 11 is mounted on base 10 and extends upwardly therefrom. Base 10 has a tapered "flower pot" casting 10a secured thereto, and this casting receives the lower end of spindle 11 which is also tapered. This mounting arrangement assures that spindle 11 is rigidly and securely held by base 10, yet permits the spindle to be easily removed from the casting.

A similar tapered casting 12a is secured to the upper end of spindle 11 which is also tapered. Casting 12a supports a series of bins 12b extending radially therefrom to be positioned respectively at various stations to be described, and a counterweight 12c is also supported by this casting and is positioned over a solder station that will also be described. The purpose of the bins is to hold various components that are to be inserted in plated circuit panel assemblies at the various stations for soldering at the solder station.

A rotatable tubular spindle 13 is also supported by base 10, and the rotatable spindle extends upwardly from the base in coaxial relation with spindle 11 and surrounds the latter spindle. Spindle 13 bears against the outer race ring of a ball bearing assembly 23 at its upper end, and it bears against the outer race of a similar ball bearing assembly at its lower end. Spindles 11 and 13 are separated by a tubular spacer 24 that bears against the inner race ring of bearing assembly 23 and the inner race ring of the similar bearing assembly at the lower end of spindle 13. Bearing assembly 23 is held in place by a cap 25 supported by spindle 11, and the lower bearing is retained by a similar cap. The caps bear against the inner race rings of the bearings, so that the caps and spacer produce a thrust in one direction and spindle 13 produces a thrust in the other direction for desired loading of the bearings. An oil retaining ring 26 for the bearing is seated on a shoulder in spindle 13.

Figures 1, 1A:
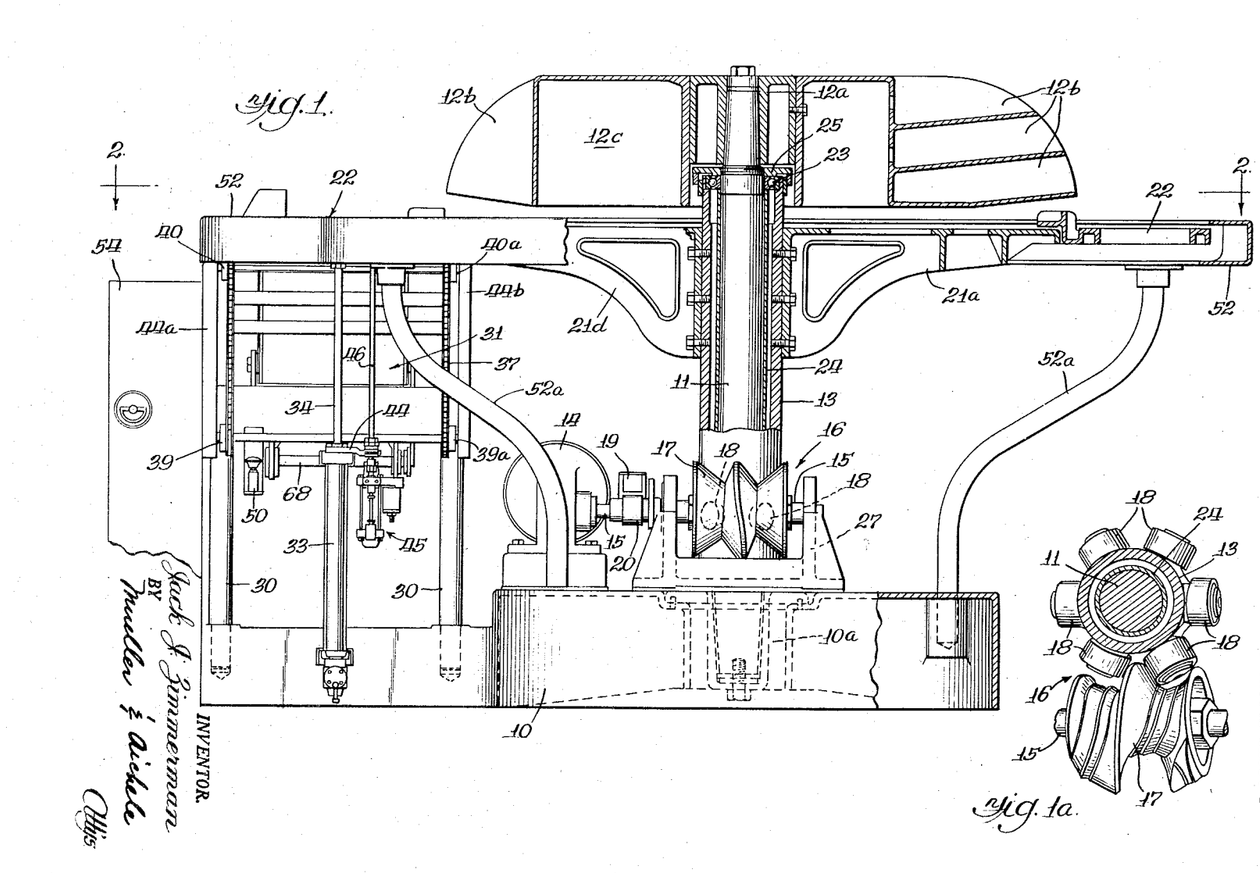
Fig. 1 is an elevational view, partly in section, of the improved automatic soldering machine of the invention.
Fig. 1A is a perspective view of certain components of the machine of Fig. 1.

A drive motor 14 is mounted on base 10, and the drive motor has a usual gear reducer and solenoid brake associated therewith. A horizontal drive shaft 15 extends from the gear reducer and is coupled to spindle 13 through a Ferguson three-dimensional cam drive assembly 16. The drive assembly is shown in Fig. 1A, and it comprises a cam 17 affixed to the drive shaft, and a plurality of disc-like cam followers 18 rotatably mounted around the periphery of spindle 13 on respective uniplanar radial axes of the spindle. The cam followers 18 are in the form of ball-bearing races secured to radially extending studs on spindle 13.

The drive assembly is such that 270° rotation of drive shaft 15 produces a 60° rotation of spindle 13, and the remaining 90° rotation of the drive shaft is within a vertical dwell on cam 17 wherein spindle 13 remains at rest. Shaft 15 has a cam 20 mounted thereon, and this cam trips a limit switch 19 upon each revolution of the drive shaft and at the beginning of the dwell mentioned above. Tripping of the limit switch de-energizes motor 14 and actuates the solenoid brake associated therewith to stop the motor. Since this takes place during the dwell interval, the actual angular position of the spindle 13 is determined by the drive assembly and not on the precision of the motor tripping circuit. Therefore, the spindle 13 is stopped at the end of each 60° angular movement thereof, and its angular position at each stop is precisely fixed by the drive assembly. The drive assembly is constructed so that the width and angle of the surface of cam 17 pre-loads at least two of the cam followers 18 at the dwell position for rigid retention of spindle 13 in its set angular position. Shaft 15 is carried in eccentric bearing holders in bracket 27 secured to base 10, and cam 17 is tapered. This allows adjustments to be made to compensate for wear between the cam and the cam followers so as to maintain a condition of absolutely no play between the cam and the followers at the dwell positions.

A series of six pallet arms 21a–21f are affixed to the upper end of vertical spindle 13 remote from base 10, and these arms extend radially outward from the vertical spindle at fixed angles with respect to one another. A corresponding series of panel-supporting members or pallets 22 are bolted to the ends of the pallet arms remote from shaft 13. The pallets 22 have the form shown in Fig. 6 and serve to support a printed circuit panel assembly. Each pallet, generally, includes a frame 22a which encloses a central opening therein. A series of horizontal supporting arms 22b extend from each side of the frame 22a, and a further series of horizontal resilient members 22m, and horizontal projections 22c, are supported respectively on transverse members 22d and 22e at the ends of the frame. Transverse members 22d and 22e are bolted to the frame 22a and are supported in slots to allow longitudinal adjustment thereof. The supporting arms 22b are also mounted in slots in frame 22a to enable these arms to be moved transversely. This provides a supporting assembly that may be adjusted to receive any of a plurality of panel sizes.

Figure 6:
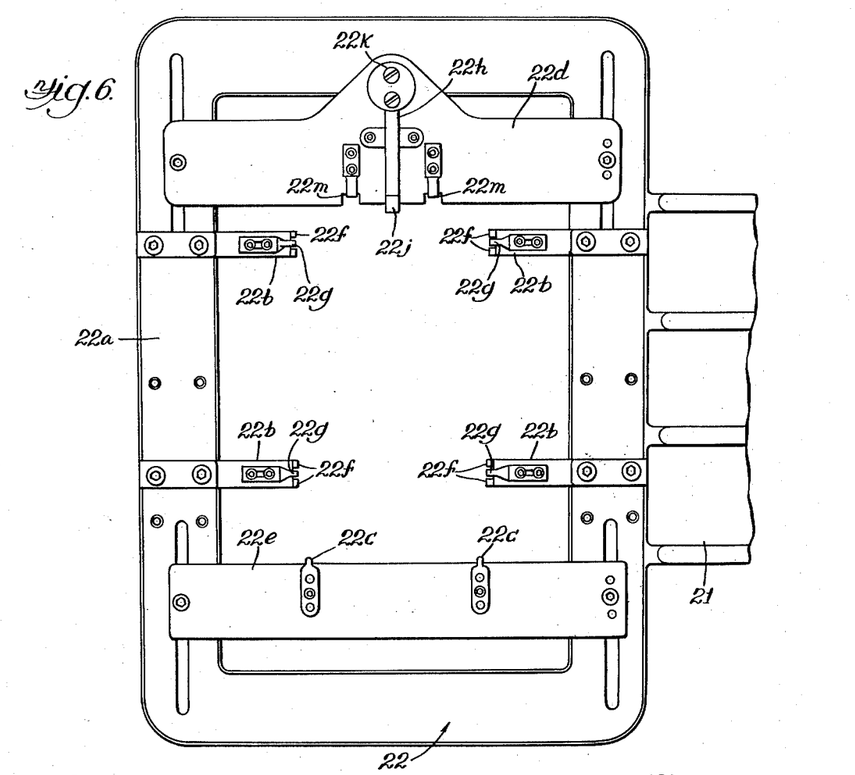
Fig. 6 is an enlarged detail view of one of the components of the machine of Fig. 1.

The projections 22c extend into notches at the ends of the panel supported by the pallet, and the panel extends over a series of stops 22f extending under and from the ends of supporting arms 22b. Arms 22b also have respective resilient members 22g secured thereto, and the resilient members bear down on and inwardly against the panel and hold it firmly in place against stops 22f and the ends of arms 22b.

The panel, therefore, is supported by stops 22f and held against transverse movement by the ends of arms 22b. Moreover, the panel is retained in this position by resilient members 22g. The assembly also includes a pivoted release lever 22h, which has an end 22j extending outwardly from and under the lever and on which the panel is supported, and the lever has a handle 22k at its other end. The resilient members 22m bear downwardly on and inwardly against the panel, so that it is rigidly supported against longitudinal movement by projections 22c and by the end of lever 22h. When it is desired to release a supported panel, it is merely necessary to depress handle 22k. This causes the end 22j of the lever to force the panel upwardly against resilient members 22g and snaps it out of the pallet. A new panel may be snapped in place merely by forcing it down against the resilient members.

A molten solder container 31 is positioned at a solder station under the plane of the pallets 22 and this container receives the pallets successively as the spindle 13 rotates, with each pallet being precisely positioned over the container during the arrested motion of spindle 13.

Figure 2:
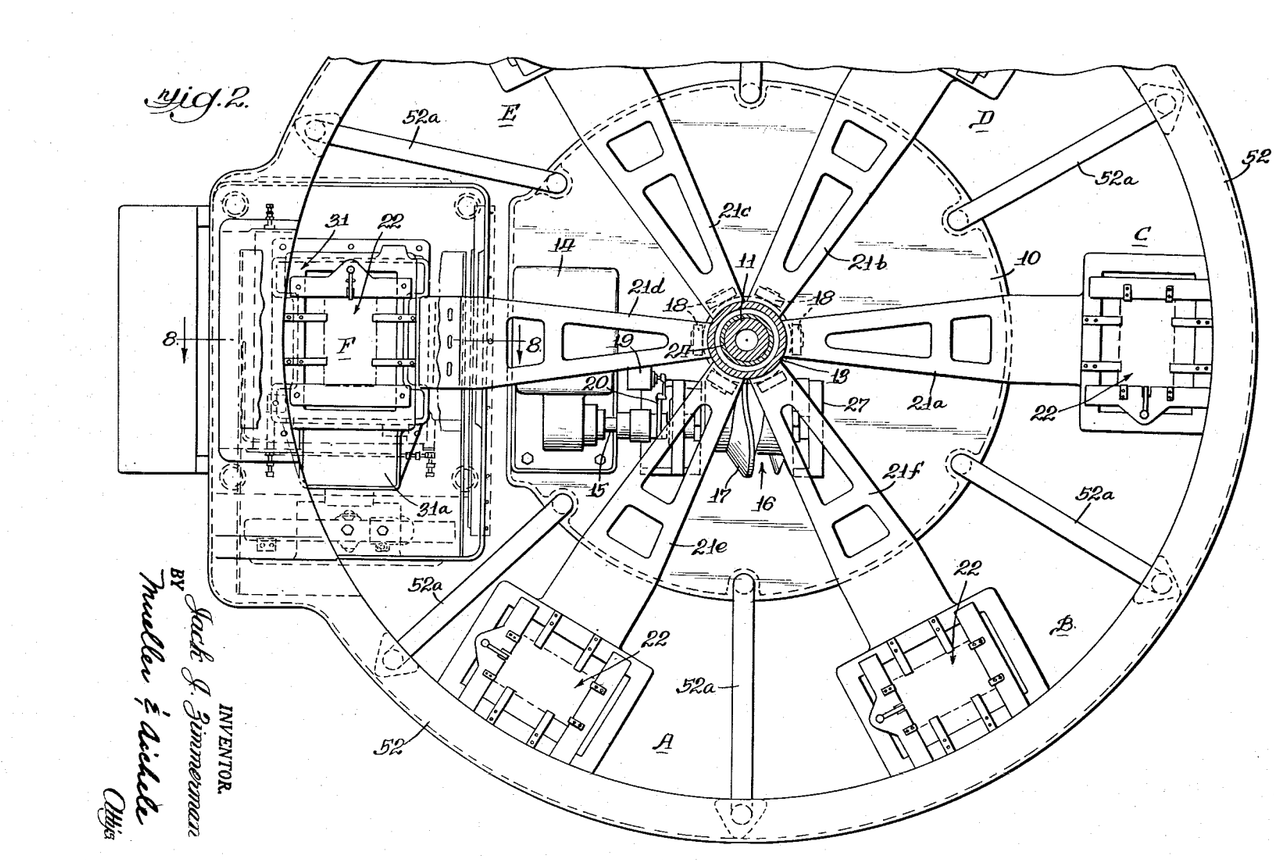
Fig. 2 is a top plan view of the machine, partly in section, taken along the lines 2—2 of Fig. 1.

As shown in Fig. 2, the machine, for example, includes six radial pallet arms and associated panel-supporting pallets. The pallets are surrounded by an annular guard rail 52 which is supported on base 10 by rods 52a. These pallets are precisely positioned over the molten solder container in succession, as shaft 13 rotates, by the Ferguson drive assembly in the manner previously discussed. Assuming in Fig. 2 that the machine is rotating in a counterclockwise direction, it can be seen that there are six stations which are indicated A, B, C, D, E and F. At station A, for example, a soldered plated circuit panel from the solder station is removed and a new panel is snapped in place on the pallet 22 as each pallet is arrested at that station. At stations A, B, C, D and E, the various components are removed from the bins 12b and appropriately positioned on each panel. At the solder station F over the solder container, the connections of the components are soldered to each plated circuit panel. As previously noted, the motion of pallets is intermittent, with energizing motor 14 being de-energized for a selected interval so that the pallets are arrested for a corresponding interval at each station. That is, for each revolution of drive shaft 15, spindle 13 rotates 60° to move the pallets from one station to the next. At each station the motor is stopped for a selected interval, and the shaft 13 is precisely positioned by the Ferguson drive assembly at each stop.

Figure 3:
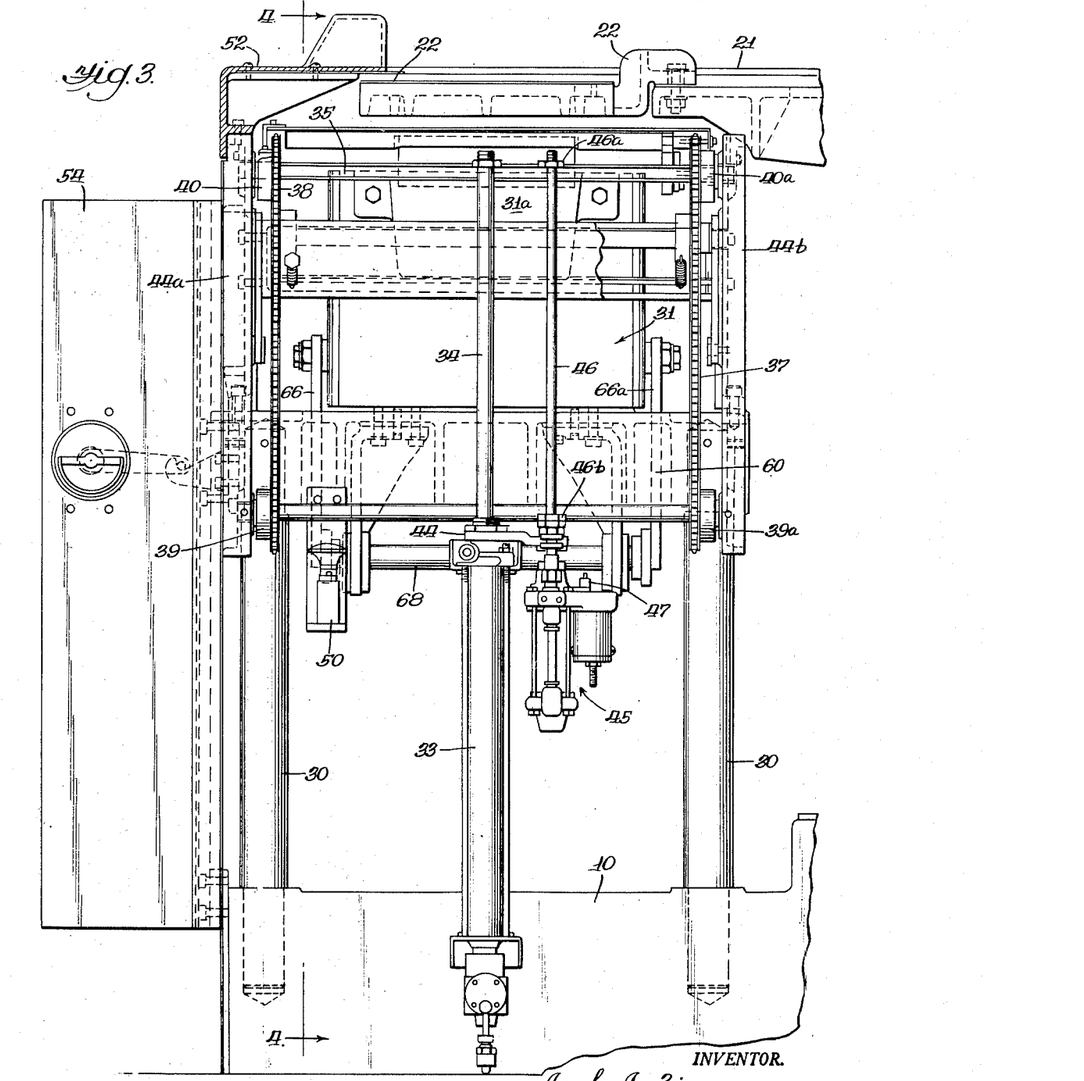
Fig. 3 is an enlarged elevational view of a portion of the machine, similar to the view of Fig. 1, and which illustrates additional features of that portion.
Figure 4:
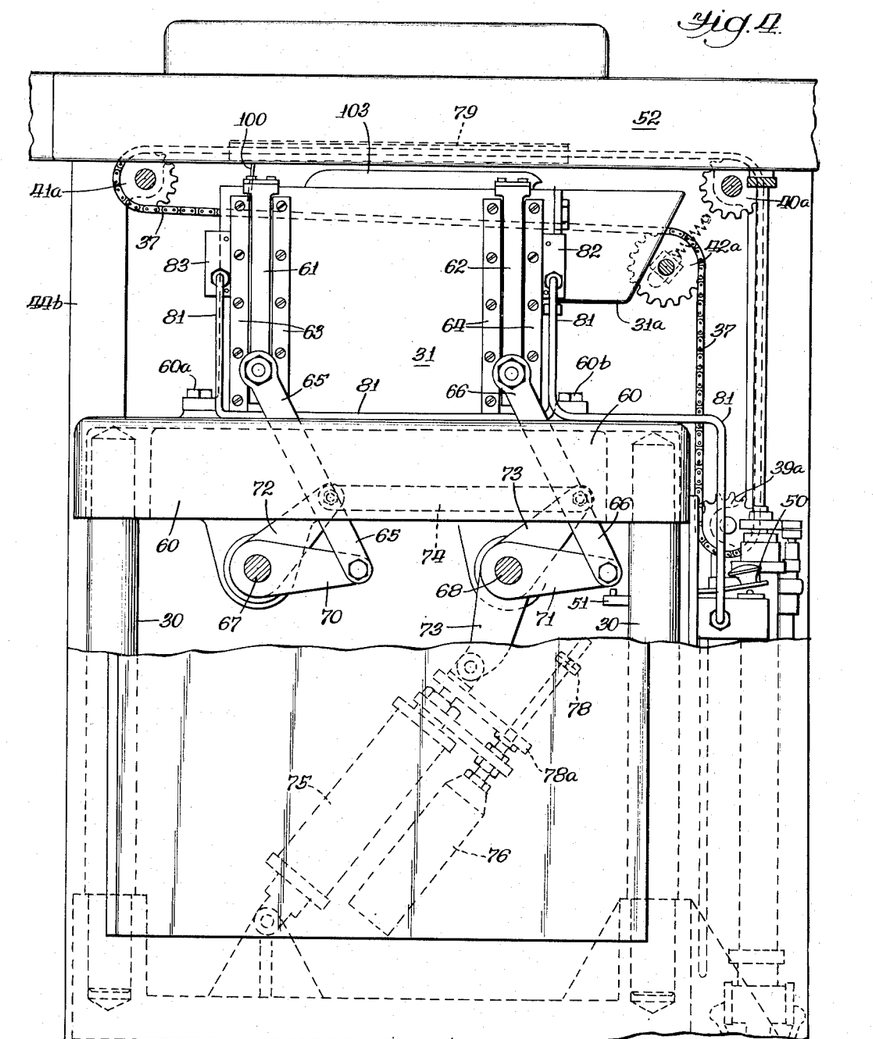
Fig. 4 is an elevational view of the portion of Fig. 3 taken along the lines 4—4 of Fig. 3.

As shown more clearly in Figs. 3 and 4, the solder container 31 is mounted on a base 60 which is supported on a series of supporting legs 30. The legs 30, in turn, are mounted on base 10. An air cylinder 33 is mounted on base 10 at one end of solder container 31, and the air cylinder includes a vertically extending piston 34. A cross arm 35 is affixed to the end of piston 34 and extends horizontally at right angles to the piston.

A pair of endless chains 37 and 38 are supported in spaced parallel relation on a series of sprockets 39–42 and on a series of sprockets 39a–42a, respectively. The sprockets 39–42 are supported on a vertical supporting frame 44a, and the sprockets 39a–42a are supported on a vertical supporting frame 44b. Frames 44a and 44b are supported by horizontal base 60. As shown in Fig. 4, chain 37 extends vertically upward at one side of the assembly around sprockets 39a and 40a, and it then extends horizontally over the top of the solder container 31 and to one side thereof and over sprocket 41a. The chain then returns over sprocket 42a to sprocket 39a. Chain 38 has the same travel over sprockets 39–42 at the other side of the solder container. Sprockets 42 and 42a are spring loaded to maintain the chains taut and yet not impede the travel thereof over the sprockets.

A hydrocheck 45 is mounted adjacent air cylinder 33 and is supported by the air cylinder by a bracket 44. The hydrocheck has a vertical piston rod 46 extending upwardly in spaced parallel relation with piston rod 34 of the air cylinder, the upper end of piston rod 46 of the hydrocheck extending through cross arm 35. The hydrocheck 45 is cocked on the upstroke of piston rod 34 as cross arm 35 strikes an adjustable nut 46a on the piston rod 46, and it gradually slows down the piston rod 34 at the lower end of its downward stroke as cross arm 35 engages an adjustable nut 46b on piston rod 46, for reasons to be described. A limit switch 47 is mounted adjacent hydrocheck 45 and is actuated by cross bar 35 at its lowermost position. This limit switch is included in the electrical circuit of the machine which will be described hereinafter.

As more clearly shown in Fig. 4, the legs 30 support the horizontal base 60 which, in turn, supports the solder container 31, the container being bolted to the base by a series of bolts such as 60a and 60b. A lifting mechanism is mounted within the solder container (see also Fig. 8), and this lifting mechanism includes a pair of vertical reciprocating spaced, parallel outer slide members mounted on opposite sides of the solder container, the pair of slide members on one side being designated 61, 62 and the pair of similar slide members on the opposite side being designated 61a, 62a. Slides 61 and 62 are carried in respective guideways 63, 64 bolted to the container 31; and slides 61a, 62a are carried in corresponding guideways 63a, 64a on the opposite side of the solder container.

Slide members 61, 62 and 61a, 62a are arranged to be vertically reciprocated by the movement of a lever linkage such a linkage for members 61, 62 being shown in Fig. 4, it being understood that a similar linkage is disposed at the opposite side of the container to actuate slide members 61a, 62a.

The linkage shown in Fig. 4 includes a pair of connecting arms 65, 66, these arms being pivoted to the respective lower ends of sliding members 61, 62. A pair of transverse pivot shafts 67, 68 are mounted below base 60 in spaced parallel relation and cross at right angles the respective rectilinear axes of sliding members 61, 62 and 61a, 62a. A pair of crank arms 70, 71 are respectively affixed to shafts 67 and 68, with the free ends of these crank arms being respectively pivoted to the lower ends of connecting arms 65, 66. A crank arm 72 and bell crank 73 are respectively affixed to shafts 67, 68; the latter crank arm and bell crank being axially spaced along the shafts from crank arms 70, 71 and angularly displaced in a counterclockwise direction by a selected angle therefrom. A horizontal connecting rod 74 is pivoted to and connects the free ends of crank arm 72 and bell crank 73.

An air cylinder 75 is angularly mounted on base 10 below base 60, and the piston of the air cylinder is pivoted to the opposite end of bell crank 73. A hydrocheck 76 is supported by air cylinder 75, and the hydrocheck has a stop member 78 on its piston that is struck by a limit bracket 78a supported by the piston of air cylinder 75 when the latter piston nears the end of its outward stroke. In this manner, the hydrocheck brings the air cylinder piston to a slow stop at the termination of its outward stroke for reasons to be described. A limit switch 51 is positioned to be actuated by connecting arm 66 when the linkage mechanism is in the position shown in Fig. 4, with slides 61, 62, 61a, 62a in their lowermost position.

The upper ends of sliding members 61, 62 and 61a, 62a are secured to corresponding brackets 90, 90a (Fig. 8) which extend downwardly into container 31 essentially parallel to the respective sliding members. The lower ends of brackets 90 are secured to an elevator 91. A series of elongated solder carrying members 92 are mounted on elevator 91 and extend upwardly therefrom in spaced parallel relation. The actual configuration of the solder-carrying members will be described in detail hereinafter. For present purposes it is sufficient to state that these members are moved by elevator 91 from a position below the level of molten solder in container 31 to a position above the surface of the molten solder, with each member carrying a globule of solder upwardly into meniscus soldering contact with localized points on a plated circuit panel supported by the various pallets 22 as they are positioned over the solder container.

Figure 8:
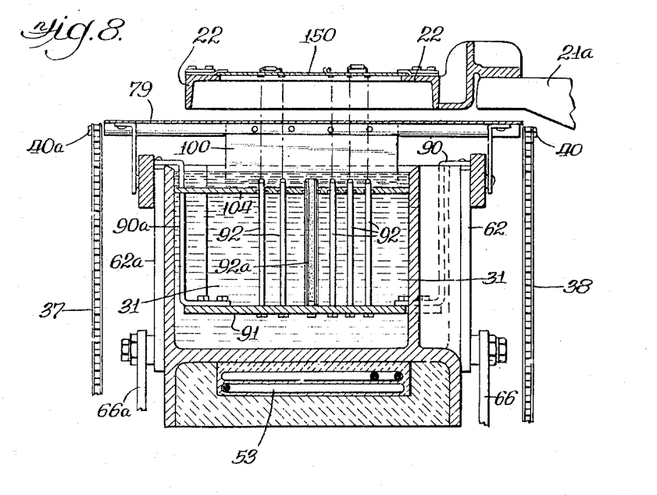
Fig. 8 is another sectional view of a portion of the machine taken along the lines 8—8 of Fig. 2.

The heating coils 53 for the solder container 31 are also shown in Fig. 8, and these coils maintain solder in the container in a molten condition.

The piston of cylinder 75 (Fig. 4) on its upward stroke rotates linkage mechanism 73, 71, 66, 74, 72, 70 and 65 in a counter-clockwise direction, and this causes connecting arms 65, 66 to move slide members 61, 62 from a lower position to an upper position. A similar action is imparted through the linkage mechanism on the other side of solder container 31 to the slide members 61a, 62a. This movement of the slide members moves elevator 91 from its lower position to its upper position, and this causes the upper tips of solder-carrying members 92 to break through the surface of the molten solder in container 31 and move to their solder meniscus contact positions. As described in the copending application Serial No. 292,424 referred to previously herein, it is desirable that a meniscus of molten solder be formed on each solder-carrying member for satisfactory soldering without actual physical contact of the solder-carrying members with the plated circuit panels. It has been found that the formation of such a meniscus on each solder-carrying member is dependent upon the rapidity with which the top of such member breaks the surface of the molten solder. The linkage mechanisms between the air cylinder 75 and slide members 61, 62 and 61a, 62a, are arranged to impart a high speed to the elevator on its upward thrust until the surface of the molten solder is broken by the tops of the solder carrying members, and then to provide a gradual decreasing speed as the members approach their solder meniscus contact positions so that the meniscus is retained and splashing is avoided. This is achieved by the arrangement shown in Fig. 4 in which crank arms 70, 71 are disposed essentially horizontal, for maximum vertical motion translation thereby to the vertical sliding members 61, 62, when the elevator 91 is in its lowermost position. The rapid vertical thrust to the sliding members 61, 62 continues for the initial portion of the swing of crank arms 70 and 71 in a counter-clockwise direction from the horizontal. However, as the elevator reaches its upper position, crank arms 70, 71 approach a vertical position with less vertical motion being translated thereby to the vertical sliding members 61, 62. Towards the end of the outward motion of the piston of air cylinder 75, the limit bracket 78a engages stop 78 on hydrocheck 76 to bring the outward motion of the piston of air cylinder 75 to a gradual stop. This causes the elevator 91 to slow down gradually to an arrested position with the meniscus of the solder carried by each of the solder carrying members 92 in its solder contact position. This enables the meniscus to contact the areas to be soldered on the plated circuit panel and to transfer heat to these areas without loss of the meniscus.

It is necessary that suitable lubrication be provided between sliding members 61, 62 and 61a, 62a and their corresponding guideways 63, 64 and 63a, 64a. However, since these members are mounted directly on the solder container 31, they operate at an extremely high temperature and it has been found that usual liquid lubricants of present day types will not perform their lubricating functions at such high temperatures, and sufficient lubrication cannot be obtained thereby. It has been found, however, that a powdered lubricant such as molybdenum disulphide is satisfactory, and such powdered lubricant is supplied to the sliding members and guideways in a manner now to be described. A series of reservoirs 82, 83, and 82a, 83a for the powdered lubricant are mounted on the solder container adjacent guideways 63, 64 and 63a, 64a, in the positions shown in Figs. 4 and 5. Conduit means extend from these reservoirs into the respective guideways to carry the powdered lubricant to the slide members 61, 62 and 61a, 62a. An air line 81 extends from the reservoirs to a manually operated pressure valve 50. Valve 50 is in the form of a spring biased key, and when the key is depressed, compressed air from lead 80 is introduced into line 81. The compressed air introduced in line 81 flows across orifices in reservoirs 82, 82a, 83, 83a and carries powdered lubricant from the orifices through the conduits to the guideways 63, 64, 63a, 64a and slide members 61, 62, 61a, 62a. With this arrangement, a sufficient quantity of powdered lubricant is supplied to the sliding members and guideways from time to time merely by manually depressing key valve 50.

Figure 5:
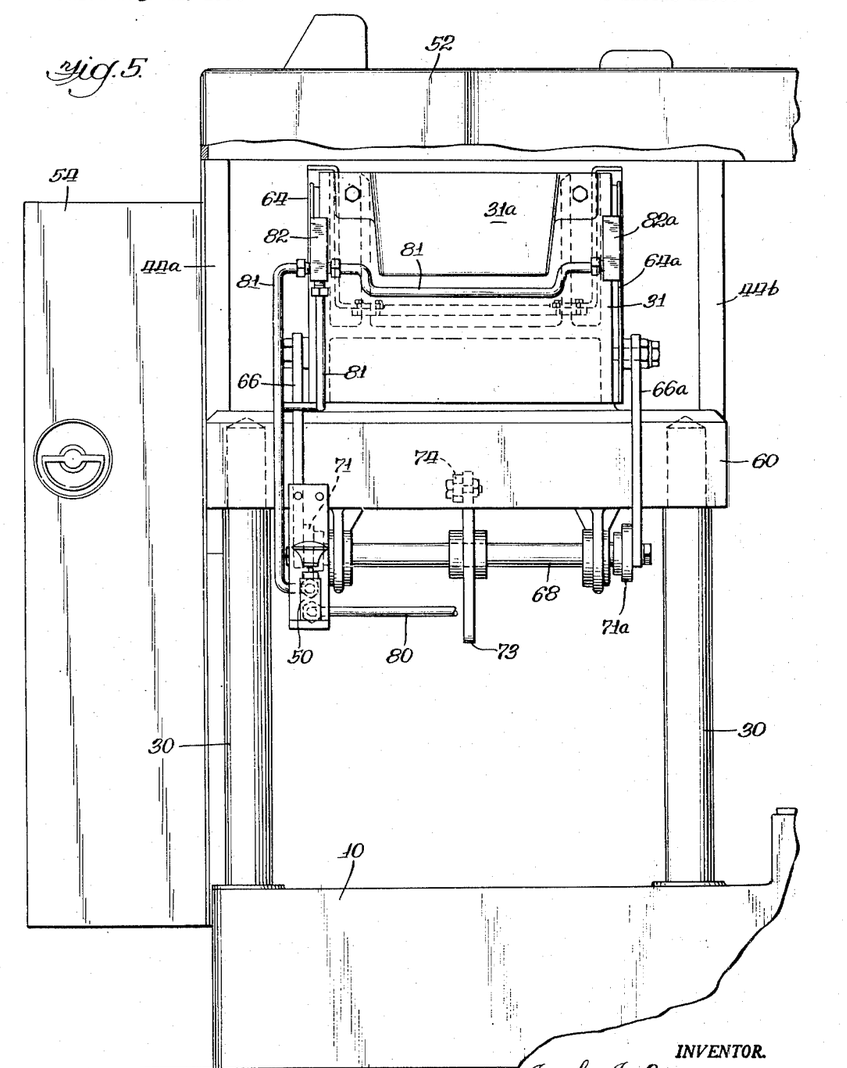
Fig. 5 is a view similar to Fig. 3 but showing particularly improved lubricating system of the invention.
Figure 5A:
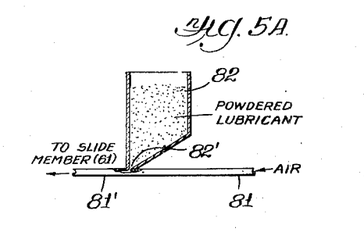
Fig. 5A is a schematic representation of the lubricating system.

As shown in Fig. 5A, the reservoirs such as reservoir 82 each have a sloping bottom terminating in a small hole 82' extending into line 81. Hole 82' has sufficiently small dimensions that the powdered lubricant normally does not pass therethrough. When key 50 is depressed, the compressed air introduced into line 81 passes across hole 82' and creates a vacuum that draws a small quantity of the lubricant through the hole to be introduced into the slide member 61 through conduit 81'. This enables a controllable amount of the lubricant to be injected to the slide members whenever the key 50 is depressed, with the rate of injection being determined by the size of hole 82'.

Figure 7:
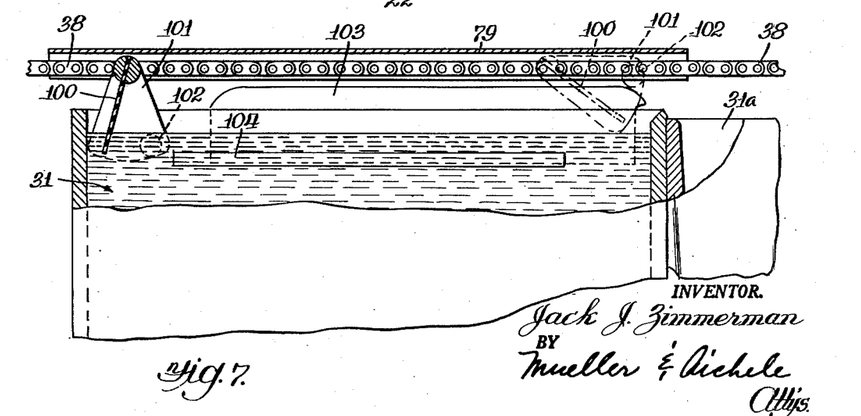
Fig. 7 is a sectional view of a portion of the machine taken along the lines 7—7 of Fig. 2.

As more clearly shown in Figs. 7 and 8, a rigidized aluminum cover 79 is affixed to chains 37, 38, and this cover is movable by the chains from a closed position in which it completely closes the open top of container 31, to an open position in which the interior of the container is exposed. The chains, themselves, are supported in appropriate tracks across the top of the solder container 31 to prevent sagging, and these tracks are mounted on frames 44a, 44b. The opening and closing of the cover is controlled by the air cylinder 33 (Fig. 3), this air cylinder being synchronized with the pallets 22 (in a manner to be described) so that its piston moves cross arm 35 to a lower position when a pallet positions a plated circuit panel over the solder container 31 so as to open the cover, and which piston moves the cross arm to an upper position to close the cover at the completion of the soldering operation and when the solder members in container 31 are dropped to their lower position.

A wiper 100 is pivoted to the chains 37, 38, and this wiper moves, with the cover, across the surface of the molten solder in container 31 upon actuation of the chains by air cylinder 33 so as to remove surface oxides from the solder and deposit such oxides in a waste bin 31a as the cover is opened, the bin being mounted on one end of container 30. The purpose of hydrocheck 45, described previously, is to slow down the chain motion as wiper 100 approaches the side of the solder container at the termination of its wiping stroke to prevent splashing of the solder adhering to the wiper as the oxide is deposited in bin 31a.

Wiper 100 may be in the form of a hard asbestos plate or may be an elongated steel wire brush. The wiper is affixed to a counterweight 101 at one end which holds the wiper in a vertical position as it performs its wiping function. The counterweight has a roller 102 mounted thereon. As shown in Fig. 7, when the chains move to the right of the drawing, wiper 100 is drawn across the surface of the molten solder in container 31. As the wiper reaches the right hand side of the container, hydrocheck 45 (Fig. 3) slows down its motion, and the wiper is slowly carried over the side of the container and into the waste bin 31a to deposit the surface oxides in the bin. On the return stroke of the wiper, it is rotated in a counterclockwise direction as it is pulled over the side of container 31 from bin 31a. This causes roller 102 to engage a track 103 and ride along the track on the return stroke. Track 103 is supported by frame 44a. The wiper is, therefore, held out of engagement with the surface of the molten solder until the wiper is returned to the left of Fig. 7 at which time it is dropped off the track to its vertical wiping position.

In earlier automatic soldering machines of this general type, some trouble has been encountered in oxides forming on the surfaces of the elongated solder carrying members 92. To obviate this condition, a stripper plate 104 (Figs. 7 and 8) is mounted within container 31 just below the surface of the molten solder and parallel to the surface. Plate 104 has a series of apertures therein which receive the elongated members 92, with the members being in scraping engagement with the bores of the apertures. The plate, for example, is composed of ¼" steel; and it is affixed by suitable brackets to the sides of the solder container 31.

When the elevator 91 is in its lowermost position, the upper tips of the solder carrying members 92 extend through the aperture in stripper plate 104, and when the elevator is moved to its upper position, the outer surfaces of the solder carrying members are scraped by the stripper plate. The stripper plate 104 also serves to maintain the members 92 properly aligned.

Figure 10:
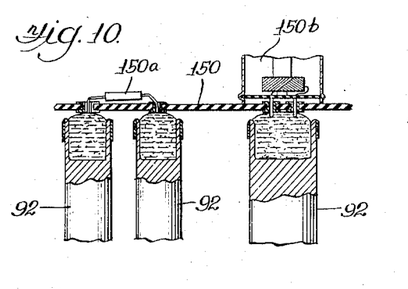
Fig. 10 is a representation of the localized solder contact established between the solder-carrying members of the machine and the connections of various components supported on a plated circuit panel.
Figure 11:
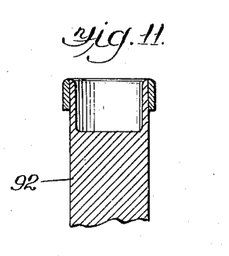
Fig. 11 is an enlarged sectional fragmentary view of one of the solder-carrying members included in the machine.

The actual configuration of the solder carrying members is shown more clearly in Figs. 10 and 11. These members are in the form of solid rods composed preferably of low alloy, low carbon steel so that they will not dissolve to any appreciable extent in the molten solder. The upper end of each rod has a cup-shaped depression formed therein which carries a globule of solder into local meniscus contact with the plated circuit panel. Fig. 10, for example, shows a panel 150 which is supported over the container 31 by one of the pallets 22, and which has a series of components such as 150a, 150b supported thereon. The connections to the components extend through metal-plated apertures in panel 150, and these connections are soldered to the plated connections on the panel by the globules of solder carried in the various solder-carrying members 92. It is preferred that the solder carrying members in their upper position be spaced slightly from the under side of panel 150 and that the solder connection be made by the meniscus of each globule in the various solder carrying members. When this is done, the meniscus of each solder carrying member by alloying action flows up the corresponding metal plated aperture of the panel 150 and fills the aperture. At the same time, heat is transferred to the board which vaporizes a flux coating that is usually applied thereto. This draws the solder to all adjoining metal surfaces on both the upper and lower surfaces of the panel. When the solder carrying member is withdrawn, the aperture remains completely full of solder to provide a strong joint for the physical retention of the component as well as an electrical connection. With this action, soldering can be effected to the upper and lower side of the panel through the plated aperture, and there is no need for any projecting connection to enable this to be accomplished.

In order that the cups at the top of members 92 will fill with solder as they are raised through the molten solder in container 31, it has been found necessary that their surfaces have solder-wettable characteristics; and this is provided by the low alloy, low carbon steel of which members 92 are preferably formed. Moreover, to preserve the meniscus, it is necessary that the outer surface of the solder carrying members be of a non solder-wettable material, otherwise the solder tends to run down these surfaces due to a syphoning action of oxides forming on the surfaces. However, when the entire surface of each member 92 is coated with a non solder-wettable material, such as chrome, it has been found that, although the meniscus is retained, a very hard oxide forms on the surface which is difficult to strip by stripper plate 104. To obviate this latter condition; and at the same time to maintain the meniscus, only a small peripheral strip around the rim of each solder carrying member is plated with a non solder-wettable material such as chrome. As shown in Fig. 8, the various scraping apertures in stripper plate 104 are undercut to provide a sharp scraping surface which removes the hard oxide from the small rim areas. The stripper plate, on the other hand, has no difficulty in removing the oxides that form on the solder-wettable steel surfaces of the remainder of the surface of each cup.

Figure 9:
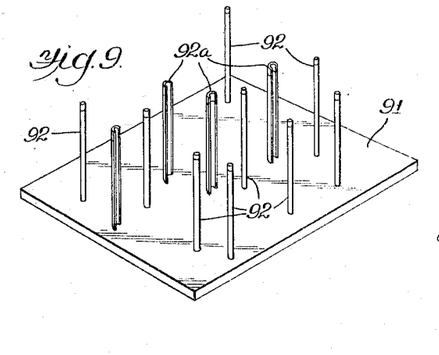
Fig. 9 is a perspective view of an elevator supported in a solder container of the machine, and of several solder carrying members mounted on the elevator.

It has been found that the provision of solder carrying members or cups having an annular section, such as cup 92a (Figs. 8 and 9), are convenient for soldering separate points on the plated circuit panel which have an arcuate placement on the panel. Such points, for example, may constitute the connections to a tube socket. With such annular shaped cups, there is a tendency for oxides to form on the inner surfaces thereof and this tendency is corrected by the provision of a crescent shaped aperture in stripper plate 104 for each such cup and whose bore is in scraping relation with the inner and outer surfaces of the corresponding annular cup.

To recapitulate the operation of the machine, energization of motor 14 (Fig. 1) produces intermittent rotation of pallet arms 21 (Fig. 2) and the pallets 22 supported thereby. Such intermittent rotation of the pallets causes them to be successively positioned precisely over the solder container 31, with the motor being de-energized for a selected interval upon such successive positioning of the pallets. Upon the positioning of a pallet over the solder container and subsequent de-energization of motor 14, air cylinder 33 (Fig. 1) is operated which causes chains 37, 38 to open cover 79 and to move wiper 100 (Figs. 7 and 8) across the surface of the molten solder and across stripper plate 104 and the tops of solder carrying members 92 so that oxides are removed and deposited in bin 31. Air cylinder 75 (Fig. 4) is then actuated to move elevator 91 and, therefore, solder carrying members 92 (Fig. 8), from their lower position to their upper position. The cup shaped tops of the solder carrying members quickly break the surface of the molten solder to form a meniscus on each member, and this meniscus is retained by the rim of non-wettable material on each cup. The meniscuses are carried into soldering contact with the connections on the plated circuit panel supported by the pallet, and after a selected time interval air cylinder 75 is actuated to retract the elevator 91 and members 92 to their lower position. Air cylinder 33 is then actuated to close the cover and to return wiper 100 to its initial position. Motor 14 is then energized to rotate pallets 22 and bring another panel into position over the solder container so that the operations may be repeated.

The control panel for the mechanism is shown in Figs. 1, 3 and 5 as 54, and the various electrical components for controlling the machine are mounted on this control panel. The control circuit for the machine is shown in Fig. 12.

Figure 12:
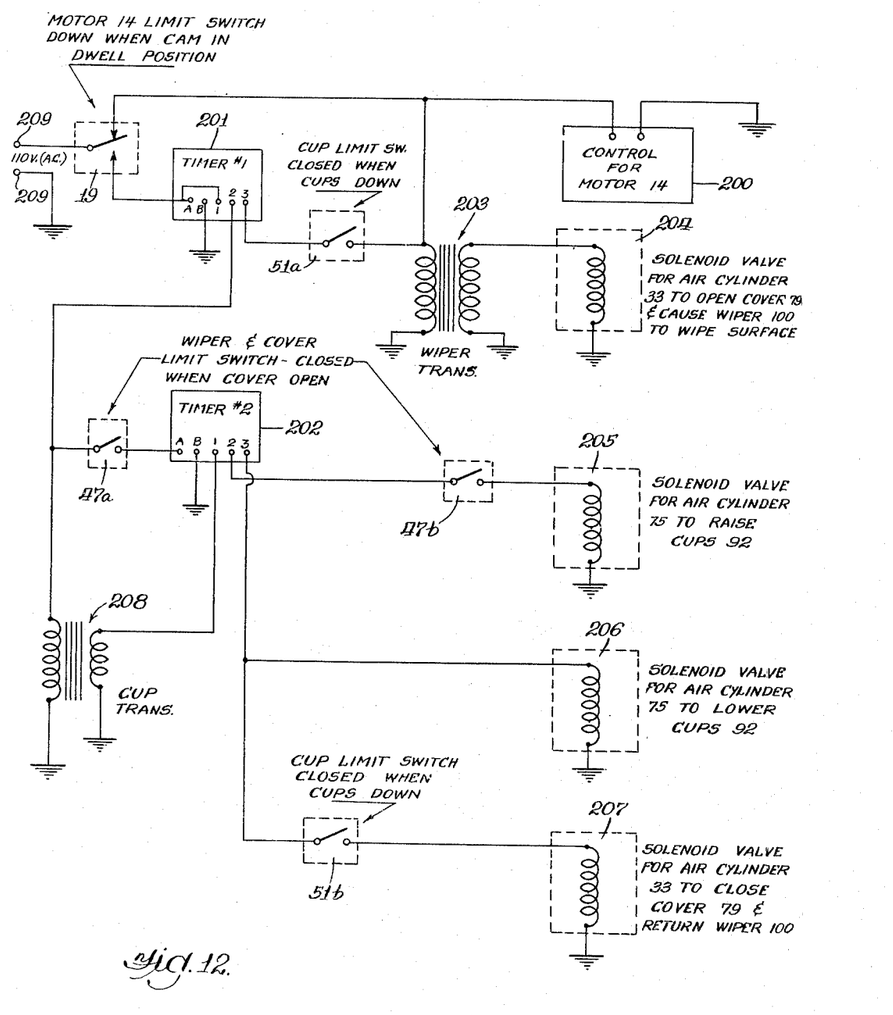
Fig. 12 is a diagram of the electrical connections included in the machine.

The control circuit of Fig. 12 includes a pair of input terminals 209 connected to a suitable A. C. control voltage source of, for example, 110 volts. One of the terminals 209 is grounded and the other is connected to limit switch 19. As previously described, limit switch 19 (Fig. 1) is actuated by a cam 20 on the drive shaft 15 of motor 14. Whenever cam 16 is in its dwell position to place a pallet 22 precisely over the solder container, cam 20 actuates limit switch 19 from its upper to its lower position.

When limit switch 19 is in its upper position, it applies the control voltage to a control unit 200 for motor 14. Whenever the voltage is applied to the control unit, the motor is energized; but when the voltage is removed from the control unit, the motor is de-energized and braked to a stop. In its upper position, limit switch 19 also applies the control voltage to the primary winding of a step-down transformer 203. The secondary winding of the transformer is connected to a solenoid valve 204 which, when energized, causes air cylinder 33 to open cover 79 (Figs. 1, 7 and 8) and cause wiper 100 to wipe the surface of the solder in the solder container.

When limit switch 19 is in its down position, it removes the control voltage from control unit 200 and transformer 203, and it applies the control voltage to terminal A of timer 201. The timer has a pair of terminals A and B, and is energized when the control voltage is impressed across these terminals. The timer also has additional terminals 1, 2 and 3; terminal 1 being connected to terminal A. After an adjustable predetermined time interval, the timer connects terminal 1 to terminal 2 and the control voltage is impressed on the latter terminal. After an additional adjustable predetermined time interval, the timer disconnects terminal 1 from terminal 2 and connects terminal 1 to terminal 3 to impress the control voltage on terminal 3.

Terminal 2 of timer 201 is connected through a section 47a of limit switch 47 to the terminal A of a timer 202. This switch section is closed when the cover 100 is in its open position. Terminal 2 of timer 1 is also connected to the primary winding of a step-down transformer 208. Terminal 3 of timer 201 is connected through a section 51a of limit switch 51 to the control unit 200 and primary winding of transformer 203. Switch section 51a is closed when the cup 92 and elevator 91 are in their lower position.

Timer 202 is similar to timer 201, and has like terminals A, B, 1, 2 and 3. The secondary winding of transformer 208 is connected to terminal 1 of timer 202; and terminal 2 of that timer is connected through a section 47b of limit switch 47 to a solenoid valve 205. Valve 205, when energized, causes air cylinder 75 to raise elevator 91 and cup 92 to their upper position.

Terminal 3 of timer 202 is connected to a solenoid valve 206. Valve 206, when energized, causes air cylinder 75 to lower elevator 91 and cup 92 to their lower position. Terminal 3 is also connected through a section 51b of limit switch 51 to a solenoid valve 207. Valve 207, when energized, causes air cylinder 33 to close cover 74 and return wiper 100 to its original position.

Assume that motor 14 is energized and is in the process of moving the pallets between the various stations. As a pallet is positioned over the solder station, limit switch 19 moves to its lower position and the motor stops. Limit switch 19 applies the control voltage to timer 201 and energizes the timer. After a selected interval timer 201 applies the control voltage to timer 202 (switch section 47a being closed), and timer 201 also applies the control voltage to the primary of transformer 208. After a further time interval, the control voltage across the secondary of transformer 208 is applied across terminals 1 and 2 of timer 202 and through switch section 47b to solenoid valve 205 to raise the solder cups to their soldering position. After a further interval, the latter connection is broken by timer 202 and the timer applies the control voltage across terminals 1 and 3 to the solenoid valve 206 to lower the solder cups. When the solder cups reach their lower position, switch section 51b causes solenoid valve 207 to be energized to close the cover 79. At the same time, switch section 51a closes establishing a connection from terminal 3 of timer 201 to the control unit 200 and to transformer 203.

After a further time interval, timer 201 breaks the connection between its terminals 2 and 3 and removes the control voltage from timer 202 and from transformer 208. Timer 201, at the same time connects its terminal 1 to its terminal 3 to apply the control voltage to control unit 200 and to transformer 203. This energizes the motor 14 and causes the pallets to move to the next station, and it also causes solenoid valve 204 to open the cover 79 and to cause wiper 100 to wipe the surface of the solder in the solder container.

In this manner the cycle of operations described previously herein is automatically controlled. As previously noted, timers 201 and 202 are adjustable so that the time interval of each step in the cycle can be set to a desired value.

The invention provides, therefore, an improved automatic soldering machine for effecting local soldering between the terminals of components supported on a printed circuit panel assembly and the conductive design formed on such a panel. The machine is relatively simple in its construction and can be constructed more economically than prior art machines of this general type. Moreover, the machine is extremely flexible in that a large variety of panel sizes can be accommodated thereby, and any desired soldering pattern can be made merely by using elevator 91 and associated solder cups 92 corresponding to the desired pattern.

The construction of the machine enables it to be used in a relatively small space, moreover, the panels to be soldered by the machine are positioned precisely over the solder station by means of a relatively simple instrumentality.

While a particular embodiment of the invention has been shown and described, modifications may be made, and it is intended in the appended claims to cover all such embodiments as fall within the true spirit and scope of the invention.

I claim:

1. A machine for applying solder to parts of the surfaces of successive ones of printed circuit panels adapted to be movably carried in the machine from one work station to another with each panel comprising a thin insulated member with a circuit pattern of thin metal conductors on a side thereof, said machine including a container for molten solder, rotary conveyor means having a plurality of supporting portions spaced at equal angular distances around the circumference and adjacent the outside thereof with the supporting portions adapted to be stopped at work positions for the machine, said supporting portions each being adapted to have a printed circuit panel removably positioned thereon for assembly of electrical components thereon and for soldering of the components thereto, means to rotate said conveyor means intermittently to position successive ones of said supporting portions and the panels carried thereon horizontally over said container, solder-carrying means positioned within said container and movable vertically to carry solder into soldering contact with a panel supported thereover, elevator means supporting said solder-carrying means for movement from a lower position below the level of the solder in said container to an upper position adjacent to the underside of the panel, said solder-carrying means having a plurality of rims defining a selected solder surface configuration such that the solder contacts only selected portions of the panel, and means to move said elevator means progressively upward to position said solder-carrying means adjacent the underside of a printed circuit panel positioned thereover with the solder in contact with the metal conductors thereon while maintaining a convex upwardly extending solder surface on said solder-carrying means.

2. A machine for applying solder to parts of the surfaces of successive ones of printed circuit panels adapted to be movably carried in the machine from one work station to another with each panel comprising a thin insulated member with a circuit pattern of thin metal conductors on a side thereof, said machine including a container for molten solder, rotary conveyor means having a plurality of supporting portions spaced at equal angular distances around the circumference and adjacent the outside thereof with the supporting portions adapted to be stopped at work positions for the machine, said supporting portions each being adapted to have a printed circuit panel removably positioned thereon for assembly of electrical components thereon and for soldering of the components thereto, means to rotate said conveyor means intermittently to establish selected intervals of rest and selected intervals of movement therefor, said conveyor means being moved the distance between adjacent panel supporting portions during each successive interval of movement and being positioned to support successive ones of said supporting portions and the panels carried thereon in a position horizontally over said container during each successive interval of rest, solder-carrying means positioned within said container and movable vertically to carry solder into soldering contact with a panel supported thereover, elevator means supporting said solder-carrying means for movement from a lower position below the level of the solder in said container to an upper position adjacent to the underside of the panel, said solder-carrying means having a plurality of rims defining a selected solder surface configuration such that the solder therein contacts selected portions of the panel, and means to move said elevator means progressively upward during each interval of rest of said conveyor means to position said solder-carrying means adjacent the underside of a printed circuit panel positioned thereover with the solder in contact with the metal conductors thereon while maintaining a convex upwardly extending solder surface on said solder-carrying means.

3. A machine for applying solder to parts of the surfaces of successive ones of printed circuit panels adapted to be movably carried in the machine from one work station to another with each panel comprising a thin insulated member with a circuit pattern of thin metal conductors on a side thereof, said machine including a container for molten solder, rotary conveyor means having a plurality of supporting portions spaced at equal angular distances around the circumference and adjacent the outside thereof with the supporting portions adapted to be stopped at work positions for the machine, said supporting portions each being adapted to have a printed circuit panel removably positioned thereon for assembling electrical components thereon and for soldering of the components thereto, a plurality of cam follower members on said conveyor means equal in number to said panel supporting portions and equally spaced angularly thereabout, a rotary cam engageable with and operable to move successive ones of said cam follower members to rotate said conveyor means, means to rotate said cam intermittently to provide a selected interval of rest and a selected interval of rotation sufficient to rotate said conveyor means through the distance between adjacent supporting portions, said conveyor means being positioned with successive ones of said supporting portions and the panels carried thereon supported in a position horizontally over said container during each successive interval of rest, solder-carrying means positioned within said molten solder container and movable vertically to carry solder into soldering contact with a panel supported thereover, elevator means supporting said solder-carrying means for movement from a lower position below the level of the solder in said container to an upper position adjacent to the underside of the panel, said solder-carrying means having a plurality of rims defining a selected solder surface configuration such that the solder therein contacts selected portions of the panel, and means to move said elevator means progressively upward during each interval of rest of said conveyor means to position said solder-carrying means adjacent the underside of a printed circuit panel positioned thereover with the solder in contact with the metal conductors thereon while maintaining a convex upwardly extending solder surface on said solder-carrying means.

4. An automatic soldering machine as defined in claim 3 having a movable cover for said soldering container and which has a normally closed position, and means to move said cover to and from an open position with said cover being opened for a selected time during each interval of rest of said rotary conveyor means.

5. A machine for applying solder to parts of the surfaces of successive ones of printed circuit panels adapted to be movably carried in the machine from one work station to another with each panel comprising a thin insulated member with a circuit pattern of thin metal conductors on a side thereof, said machine including a container for molten solder, rotary conveyor means having a vertical rotatable support and having a plurality of supporting portions spaced radially outward therefrom at equal angular distances therearound and moving upon rotation of said rotary conveyor means, said supporting portions each being adapted to have a printed circuit panel removably positioned thereon for assembling electrical components thereon and for soldering of the components thereto, a plurality of cam follower members on said conveyor means equal in number to said panel supporting portions and equally spaced angularly thereabout, a rotary helical cam engageable with and operable to move successive ones of said cam followed members to rotate said conveyor means, said helical cam having a compound surface providing a drive interval and a dwell interval during each revolution thereof, means to rotate said cam intermittently to provide a selected interval of rest and a selected interval of rotation sufficient to rotate said conveyor means through the distance between adjacent supporting portions, said conveyor being positioned with successive ones of said supporting portions and the panels carried thereon each supported in a position horizontally over said molten solder container during each successive interval of rest, a slidable cover normally closing said container, a slidable wiper movable across said container to clean scum from the surface of solder therein, an endless chain assembly connecting said cover and said wiper for conjoint movement, reciprocating drive means operatively connected to said chain assembly and operate to move said cover to an open position and to move said wiper across the surface of solder in said container, a first control means for de-energizing said cam rotating means during each dwell interval and for acuating said reciprocating drive means to move said cover to said open position, solder-carrying means positioned within said container and movable vertically to carry solder into soldering contact with a panel supported thereover, elevator means supporting said solder-carrying means for movement from a lower position below the level of the solder in said container to an upper position adjacent to the underside of the panel, said solder-carrying means having a plurality of rims defining a selected solder surface configuration such that the solder contacts selected portions of the panel, means to move said elevator means progressively upward to position said solder-carrying means adjacent the underside of a printed circuit panel positioned thereover with the solder in contact with the metal conductors thereon while maintaining a convex upwardly extending solder surface on said solder-carrying means, and a second control means for actuating said elevator moving means upon de-energization of said cam rotating means and the opening of said cover to move said elevator means in soldering position.

6. A machine for applying solder to parts of the surfaces of successive ones of printed circuit panels adapted to be movably carried in the machine from one work station to another with each panel comprising a thin insulated member with a circuit pattern of thin metal conductors on a side thereof, said machine including a container for molten solder, rotary conveyor means having a plurality of supporting portions spaced at equal angular distances around the circumference and adjacent the outside thereof with the supporting portions adapted to be stopped at work positions for the machine, said supporting portions each being adapted to have a printed circuit panel removably positioned thereon for assembly of electrical components thereon and for soldering of the components thereto, means to rotate said conveyor means intermittently to position successive ones of said supporting portions and the panels carried thereon horizontally over said molten solder container, solder-carrying means positioned within said container and movable vertically to carry solder into soldering contact with a panel supported thereover, elevator means supporting said solder-carrying means for movement from a lower position below the level of the solder in said container to an upper position adjacent to the underside of the panel, said solder-carrying means having a plurality of rims defining a selected solder surface configuration such that the solder contacts selected portions of the panel, means to move said elevator means progressively upward to position said solder-carrying means adjacent the underside of a printed circuit panel positioned thereover with the solder in contact with the metal conductors thereon while maintaining a convex upwardly extending solder surface on said solder-carrying means, said elevator moving means including a reciprocating member slidably mounted on said container and operated at the temperature of said container, a reservoir for a high temperature powdered lubricant and having an orifice at the bottom thereof, conduit means extending across said orifice to said reciprocating member, and means to supply compressed air through said conduit means to draw powdered lubricant from said reservoir and to supply the same to said reciprocating member.

7. A machine for applying solder to parts of the surfaces of successive ones of printed circuit panels adapted to be movably carried in the machine from one work station to another with each panel comprising a thin insulated member with a circuit pattern of thin metal conductors on a side thereof, said machine including a container for molten solder, rotary conveyor means having a plurality of supporting portions spaced at equal angular distances around the circumference and adjacent the outside thereof with the supporting portions adapted to be stopped at work positions for the machine, said supporting portions each being adapted to have a printed circuit panel removably positioned thereon for assembly of electrical components thereon and for soldering of the components thereto, means to rotate said conveyor means intermittently to position successive ones of said supporting portions and the panels carried thereon horizontally over said molten solder container, a plurality of finger-like solder-carrying members having solder-carrying recesses at their upper ends and positioned within said container and movable vertically to carry solder into soldering contact with a panel supported thereover, elevator means supporting said solder-carrying members for movement from a lower position below the level of the solder in said container to an upper position adjacent to the underside of the panel, a stripper plate supported in said container and having a plurality of apertures aligned with said solder-carrying members and of a size to scrape scum and oxides from the surfaces of said solder-carrying members upon movement therethrough, and means to move said elevator means progressively upward to position the upper ends of said solder-carrying members adjacent to the underside of a printed circuit panel positioned thereover with the solder in contact with selected portions of the metal conductors thereon while maintaining a convex upwardly extending solder surface on said solder-carrying members.

8. A machine for applying solder to parts of the surfaces of successive ones of printed circuit panels adapted to be movably carried in the machine from one work station to another with each panel comprising a thin insulated member with a circuit pattern of thin metal conductors on a side thereof, said machine including a container for molten solder, rotary conveyor means having a plurality of supporting portions spaced at equal angular distances around the circumference and adjacent the outside thereof with the supporting portions adapted to be stopped at work positions for the machine, an annular guard rail of channel-shaped cross section extending around and partially enclosing the circumferential portion of said conveyor means, said supporting portions each being adapted to have a printed circuit panel movably positioned thereon for assembling electrical components thereon and for soldering of the components thereto, a plurality of cam follower members on said conveyor means equal in number to said panel supporting portions and equally spaced angularly thereabout, a rotary cam engageable with and operable to move successive ones of said cam follower members to rotate said conveyor means, means to rotate said cam intermittently to provide a selected interval of rest and a selected interval of rotation sufficient to rotate said conveyor means through the distance between adjacent supporting portions, said conveyor means being positioned with successive ones of said supporting portions and the panels carried thereon supported in a position horizontally over said molten solder container during each successive interval of rest, solder-carrying means positioned within said molten solder container and movable vertically to carry solder into soldering contact with a printed circuit panel supported thereover, elevator means supporting said solder-carrying means for movement from a lower position below the level of the solder in said container to an upper position adjacent to the underside of the panel, said solder-carrying means having a plurality of rims defining a selected solder surface configuration such that the solder therein contacts selected portions of the panel, and means to move said elevator means progressively upward during each interval of rest of said conveyor means to position said solder-carrying means adjacent the underside of a printed circuit panel positioned thereover with the solder in contact with the metal conductors thereon while maintaining a convex upwardly extending solder surface on said solder-carrying means.

9. A machine for applying solder to parts of the surfaces of successive ones of printed circuit panels adapted to be movably carried in the machine from one work station to another with each panel comprising a thin insulated member with a circuit pattern of thin metal conductors on a side thereof, said machine having a plurality of work stations for assembly of electrical components on a printed circuit panel and at least one work station for soldering a printed circuit panel with the electrical components assembled thereon, said machine including a container for molten solder at said solder work station, rotary conveyor means having a plurality of supporting portions corresponding to the total number of work stations and spaced at equal angular distances around the circumference and adjacent the outside thereof with the supporting portions adapted to be stopped at successive work stations for the machine, said supporting portions each being adapted to have a printed circuit panel removably positioned thereon for assembly of electrical components thereon and for soldering of the components thereto, means on said machine adjacent to each component assembly work station supporting a plurality of electrical components for insertion in a printed circuit panel stopped at said station, means to rotate said conveyor means intermittently to move successive ones of said supporting portions and the panels carried thereon from one work station to the next and to position successive ones of said supporting portions and the panels carried thereon horizontally over said molten solder container, solder-carrying means within said container and movable vertically to carry solder into soldering contact with a panel supported thereover, elevator means supporting said solder-carrying means for movement from a lower position below the level of the solder in said molten solder container to an upper position adjacent to the underside of the panel, said solder-carrying means having a plurality of rims defining a selected solder surface configuration such that the solder contacts only selected portions of the panel, and means to move said elevator means progressively upward to position said solder-carrying means adjacent the underside of a printed circuit panel positioned thereover with the solder in contact with the metal conductors thereon while maintaining a convex upwardly extending solder surface on said solder-carrying means.

References Cited in the file of this patent
UNITED STATES PATENTS

| | | |
|---|---|---|
| 658,596 | Simpson | Sept. 25, 1900 |
| 1,000,791 | Erikson | Aug. 15, 1911 |
| 1,182,777 | Lavoo | May 9, 1916 |
| 1,502,773 | Gueritey | July 29, 1924 |
| 1,537,116 | Howlett | May 12, 1925 |
| 1,687,605 | Bundy | Oct. 16, 1928 |
| 1,753,639 | Badgley | Apr. 8, 1930 |
| 1,783,642 | Fergusen et al. | Dec. 2, 1930 |
| 1,997,694 | Morick et al. | Apr. 16, 1935 |
| 2,463,158 | De Lorme et al. | Mar. 1, 1949 |
| 2,533,919 | Christiansen et al. | Dec. 12, 1950 |
| 2,572,952 | Rymal | Oct. 30, 1951 |
| 2,603,178 | Cahenzli et al. | July 15, 1952 |